US012578614B2

(12) United States Patent
Takabayashi et al.

(10) Patent No.: US 12,578,614 B2
(45) Date of Patent: Mar. 17, 2026

(54) SEMICONDUCTOR OPTICAL PHASE MODULATOR AND METHOD OF TESTING THE SAME

(71) Applicant: Mitsubishi Electric Corporation, Tokyo (JP)

(72) Inventors: Masakazu Takabayashi, Tokyo (JP); Yosuke Suzuki, Tokyo (JP); Satoshi Nishikawa, Tokyo (JP); Koichi Akiyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 320 days.

(21) Appl. No.: 18/561,304

(22) PCT Filed: May 25, 2021

(86) PCT No.: PCT/JP2021/019813
§ 371 (c)(1),
(2) Date: Nov. 16, 2023

(87) PCT Pub. No.: WO2022/249283
PCT Pub. Date: Dec. 1, 2022

(65) Prior Publication Data
US 2024/0231176 A1 Jul. 11, 2024

(51) Int. Cl.
*G02F 1/225* (2006.01)
*G02F 1/21* (2006.01)

(52) U.S. Cl.
CPC ............ *G02F 1/2257* (2013.01); *G02F 1/212* (2021.01)

(58) Field of Classification Search
None
See application file for complete search history.

(56) References Cited

U.S. PATENT DOCUMENTS

| | | | |
|---|---|---|---|
| 6,005,708 A | 12/1999 | Leclerc et al. | |
| 7,978,390 B2 * | 7/2011 | Kikuchi ................. | G02F 1/225 |
| | | | 359/238 |
| 10,845,668 B2 * | 11/2020 | Ogiso ................... | G02F 1/2257 |

(Continued)

FOREIGN PATENT DOCUMENTS

| | | |
|---|---|---|
| JP | H10-319454 A | 12/1998 |
| JP | 2012-004441 A | 1/2012 |

(Continued)

OTHER PUBLICATIONS

International Search Report and Written Opinion mailed on Aug. 10, 2021, received for PCT Application PCT/JP2021/019813, filed on May 25, 2021, 9 pages including English Translation.

*Primary Examiner* — Sharrief I Broome
*Assistant Examiner* — Journey F Sumlar
(74) *Attorney, Agent, or Firm* — XSENSUS LLP

(57) ABSTRACT

A semiconductor optical phase modulator includes an optical phase modulation element, a first semiconductor optical amplifier to amplify light input to the optical phase modulation element, and a second semiconductor optical amplifier to amplify modulated signal light output from the optical phase modulation element. A light input end of the semiconductor optical phase modulator is a light input end face of the first semiconductor optical amplifier. A light output end of the semiconductor optical phase modulator is a light output end face of the second semiconductor optical amplifier.

10 Claims, 9 Drawing Sheets

(56)     References Cited

U.S. PATENT DOCUMENTS

| 2017/0040775 A1* | 2/2017 | Takabayashi | ............. H01S 5/50 |
| 2017/0146734 A1 | 5/2017 | Kiyota et al. | |
| 2017/0244491 A1* | 8/2017 | Hayashi | ................ H04B 10/54 |
| 2019/0317341 A1 | 10/2019 | Nishikawa | |
| 2023/0251417 A1 | 8/2023 | Suzuki et al. | |

FOREIGN PATENT DOCUMENTS

| JP | 6490705 | B2 | 3/2019 |
| JP | 6541898 | B2 | 7/2019 |
| JP | 6610834 | B2 | 11/2019 |

* cited by examiner

FIG.12

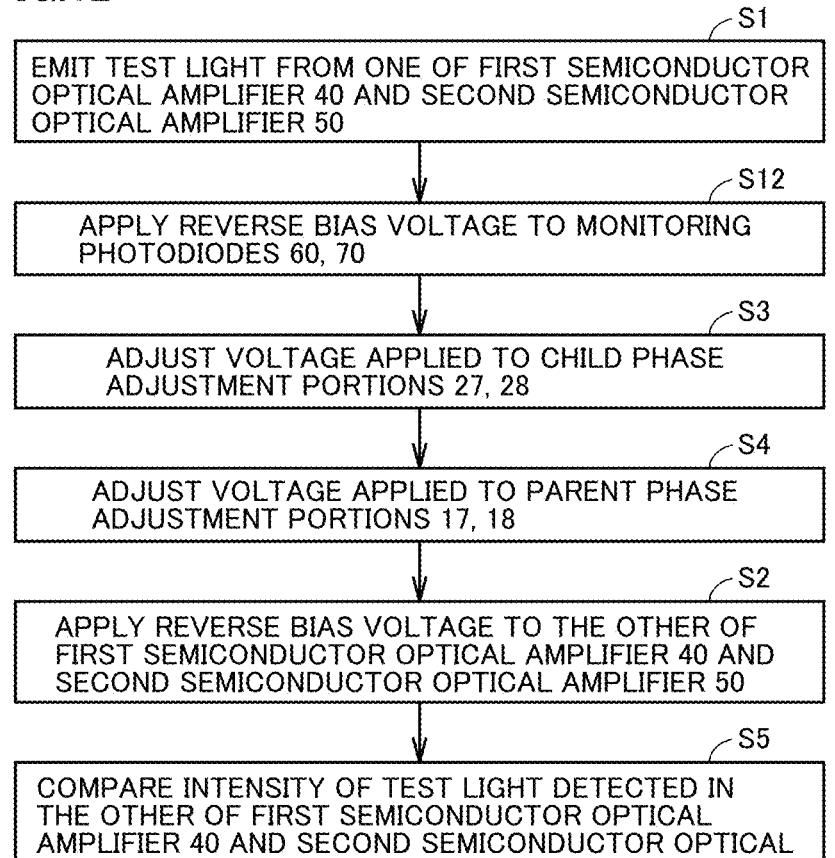

S1
EMIT TEST LIGHT FROM ONE OF FIRST SEMICONDUCTOR OPTICAL AMPLIFIER 40 AND SECOND SEMICONDUCTOR OPTICAL AMPLIFIER 50

S12
APPLY REVERSE BIAS VOLTAGE TO MONITORING PHOTODIODES 60, 70

S3
ADJUST VOLTAGE APPLIED TO CHILD PHASE ADJUSTMENT PORTIONS 27, 28

S4
ADJUST VOLTAGE APPLIED TO PARENT PHASE ADJUSTMENT PORTIONS 17, 18

S2
APPLY REVERSE BIAS VOLTAGE TO THE OTHER OF FIRST SEMICONDUCTOR OPTICAL AMPLIFIER 40 AND SECOND SEMICONDUCTOR OPTICAL AMPLIFIER 50

S5
COMPARE INTENSITY OF TEST LIGHT DETECTED IN THE OTHER OF FIRST SEMICONDUCTOR OPTICAL AMPLIFIER 40 AND SECOND SEMICONDUCTOR OPTICAL AMPLIFIER 50 WITH REFERENCE LIGHT INTENSITY

SEMICONDUCTOR OPTICAL PHASE MODULATOR AND METHOD OF TESTING THE SAME

CROSS-REFERENCE TO RELATED APPLICATION

This application is based on PCT filing PCT/JP2021/019813, filed May 25, 2021, the entire contents of which are incorporated herein by reference.

TECHNICAL FIELD

The present disclosure relates to a semiconductor optical phase modulator and a method of testing the same.

BACKGROUND ART

Japanese Patent No. 6541898 (PTL 1) discloses an optical phase modulator. This optical phase modulator includes a QPSK phase modulator, a first semiconductor optical amplifier disposed at the input of the QPSK phase modulator, and a second semiconductor optical amplifier disposed at the output of the QPSK phase modulator.

CITATION LIST

Patent Literature

PTL 1: Japanese Patent No. 6541898

SUMMARY OF INVENTION

Technical Problem

To input light to an optical phase modulator, the light input end of the optical phase modulator is optically coupled to an input optical fiber. To transmit modulated signal light generated by the light optical phase modulator, the light output end of the optical phase modulator is optically coupled to an output optical fiber. However, in the optical phase modulator disclosed in PTL 1, an input passive waveguide is formed between the light input end of the optical phase modulator and the first semiconductor optical amplifier, and an output passive waveguide is formed between the light output end of the optical phase modulator and the second semiconductor optical amplifier. The optical confinement factor of each of the input passive waveguide and the output passive waveguide is greater than the optical confinement factor of the first semiconductor optical amplifier and greater than the optical confinement factor of the second semiconductor optical amplifier. Since the mode field diameter of light in each of the input passive waveguide and the output passive waveguide is small, the optical coupling loss between the optical phase modulator and the input optical fiber and the optical coupling loss between the optical phase modulator and the output optical fiber are large.

Testing of the optical phase modulator disclosed in PTL 1 is performed by the following method. A test light source and an input optical fiber are disposed at the light input end of the optical phase modulator. An output optical fiber and a power meter are disposed at the light output end of the optical phase modulator. Light emitted from the light source enters the optical phase modulator through the input optical fiber. Light output from the optical phase modulator enters the power meter through the output optical fiber. When the output of the power meter is equal to or greater than a reference output, it is determined that the optical phase modulator is non-defective. On the other hand, when the output of the power meter is less than the reference output, it is determined that the optical phase modulator is defective. In such a method of testing an optical phase modulator, it is necessary to precisely align the input optical fiber and the output optical fiber to the optical phase modulator. However, it takes much time to align the input optical fiber and the output optical fiber to the optical phase modulator.

An object of a first aspect of the present disclosure is to provide a semiconductor optical phase modulator in which the optical coupling loss to an optical fiber can be reduced. An object of a second aspect of the present disclosure is to provide a method of testing a semiconductor optical phase modulator in which the testing time for the semiconductor optical phase modulator can be shortened.

Solution to Problem

A semiconductor optical phase modulator according to the present disclosure includes an optical phase modulation element, a first semiconductor optical amplifier to amplify light input to the optical phase modulation element, and a second semiconductor optical amplifier to amplify modulated signal light output from the optical phase modulation element. The first semiconductor optical amplifier includes a first core layer having a first multiple quantum well structure. The optical phase modulation element includes a second core layer having a second multiple quantum well structure. The second semiconductor optical amplifier includes a third core layer having a third multiple quantum well structure. A first thickness of the first core layer is smaller than a second thickness of the second core layer. A first number of well layers of the first multiple quantum well structure is smaller than a second number of well layers of the second multiple quantum well structure. A third thickness of the third core layer is smaller than the second thickness of the second core layer. A third number of well layers of the third multiple quantum well structure is smaller than the second number of well layers of the second multiple quantum well structure. A light input end of the semiconductor optical phase modulator is a light input end face of the first semiconductor optical amplifier. A light output end of the semiconductor optical phase modulator is a light output end face of the second semiconductor optical amplifier.

A method of testing the semiconductor optical phase modulator according to the present disclosure includes: applying a forward bias voltage to one of the first semiconductor optical amplifier and the second semiconductor optical amplifier to emit test light from one of the first semiconductor optical amplifier and the second semiconductor optical amplifier; applying a reverse bias voltage to the other of the first semiconductor optical amplifier and the second semiconductor optical amplifier; and comparing an intensity of test light detected in the other of the first semiconductor optical amplifier and the second semiconductor optical amplifier with a reference light intensity.

Advantageous Effects of Invention

Therefore, the optical confinement factor of the first semiconductor optical amplifier is smaller than the optical confinement factor of the optical phase modulation element, and the optical confinement factor of the second semiconductor optical amplifier is smaller than the optical confinement factor of the optical phase modulation element. The mode field diameter of light in each of the first semiconductor optical amplifier and the second semiconductor optical amplifier is increased. The optical coupling loss between the semiconductor optical phase modulator and the input optical fiber and the optical coupling loss between the semiconductor optical phase modulator and the output optical fiber can be reduced.

In the method of testing the semiconductor optical phase modulator according to the present disclosure, it is not necessary to prepare a test light source, an input optical fiber, an output optical fiber, and a power meter separately from the semiconductor optical phase modulator, and it is not necessary to align a test light source, an input optical fiber, an output optical fiber, and a power meter to the semiconductor optical phase modulator. The method of testing the semiconductor optical phase modulator therefore can shorten the test time for the semiconductor optical phase modulator.

BRIEF DESCRIPTION OF DRAWINGS

FIG. 12 is a flowchart of a method of testing the semiconductor optical phase modulator in the second embodiment.

DESCRIPTION OF EMBODIMENTS

Figure 1:
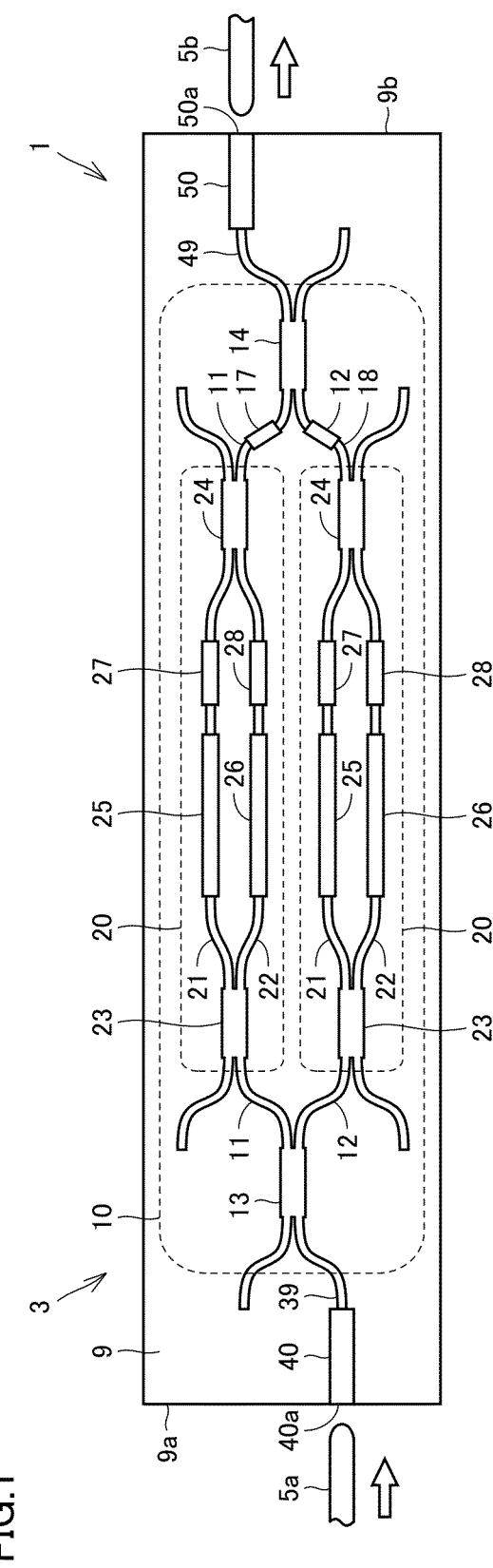
FIG. 1 is a schematic plan view of a semiconductor optical phase modulator in a first embodiment.

Embodiments of the present disclosure will be described below. The same configuration is denoted by the same reference number and a description thereof is not repeated.

First Embodiment

Referring to FIG. 1 to FIG. 6, a semiconductor optical phase modulator 1 in a first embodiment will be described. Semiconductor optical phase modulator 1 mainly includes an optical phase modulation element 3, a first semiconductor optical amplifier 40, a second semiconductor optical amplifier 50, and a substrate 9.

Substrate 9 is, for example, a semiconductor substrate such as an InP substrate. Substrate 9 includes a first end face 9a and a second end face 9b. Second end face 9b may be on the side opposite to first end face 9a. Optical phase modulation element 3, first semiconductor optical amplifier 40, and second semiconductor optical amplifier 50 are formed on substrate 9.

Optical phase modulation element 3 is, for example, an in-phase quadrature (IQ) optical modulation portion capable of quadrature phase shift keying (QPSK). Optical phase modulation element 3 includes a parent Mach-Zehnder interferometer 10, two child Mach-Zehnder interferometers 20, phase modulation portions 25 and 26, parent phase adjustment portions 17 and 18, and child phase adjustment portions 27 and 28. Parent Mach-Zehnder interferometer 10, two child Mach-Zehnder interferometers 20, phase modulation portions 25 and 26, parent phase adjustment portions 17 and 18, and child phase adjustment portions 27 and 28 may include a core layer (core layers 32, 42, 52) common in material and layer structure.

Parent Mach-Zehnder interferometer 10 includes two first arm waveguides 11 and 12, an optical splitter 13, and an optical coupler 14.

Figure 2:
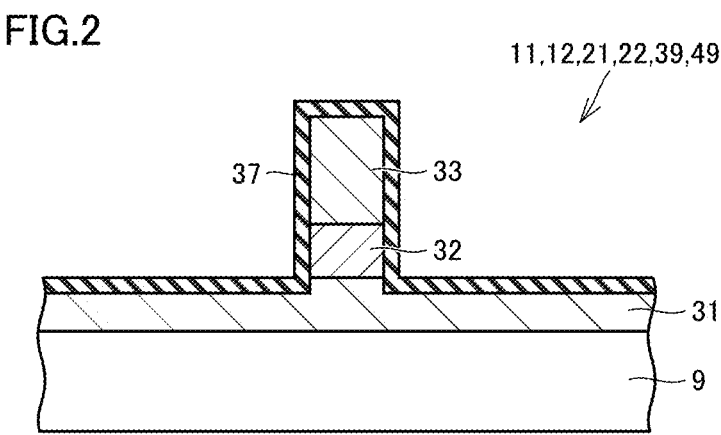
FIG. 2 is a schematic cross-sectional view of a passive waveguide of the semiconductor optical phase modulator in the first embodiment.

As shown in FIG. 2, first arm waveguides 11 and 12 each include a lower cladding layer 31, a core layer 32, and an upper cladding layer 33. First arm waveguides 11 and 12 may each further include an insulating protective layer 37.

Lower cladding layer 31 is formed on substrate 9. Lower cladding layer 31 is, for example, an n-type InP layer. Core layer 32 is formed on lower cladding layer 31. The refractive index of core layer 32 is greater than the refractive index of lower cladding layer 31 and greater than the refractive index of upper cladding layer 33. Core layer 32 is formed of, for example, a semiconductor material such as AlGaInAs. Core layer 32 has, for example, a multiple quantum well (MQW) structure. Upper cladding layer 33 is formed on core layer 32. Upper cladding layer 33 is, for example, an i-type InP layer. First arm waveguides 11 and 12 each have a high-mesa structure.

Insulating protective layer 37 is formed on the high-mesa structure. Specifically, insulating protective layer 37 is formed on an upper surface and side surfaces of upper cladding layer 33, on side surfaces of core layer 32, and on lower cladding layer 31. Insulating protective layer 37 is formed of an inorganic insulating material such as silicon oxide or silicon nitride or an organic insulating material such as benzocyclobutene (BCB). Insulating protective layer 37 prevents semiconductor optical phase modulator 1 from coming into contact with oxygen or water included in the surrounding atmosphere of semiconductor optical phase modulator 1 and being oxidized or altered.

Optical splitter 13 is formed between two first arm waveguides 11, 12 and first semiconductor optical amplifier

5

Figure 3:
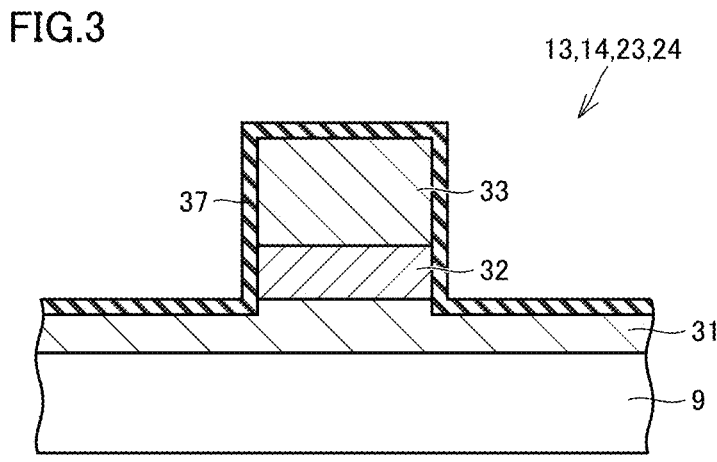
FIG. 3 is a schematic cross-sectional view of an optical splitter and an optical coupler of the semiconductor optical phase modulator in the first embodiment.

40. Optical splitter 13 splits light amplified by first semiconductor optical amplifier 40 and outputs the split light to two first arm waveguides 11 and 12. As shown in FIG. 3, optical splitter 13 includes lower cladding layer 31, core layer 32, and upper cladding layer 33 in the same manner as first arm waveguides 11 and 12. Optical splitter 13 is formed of the same material and has the same layer structure as first arm waveguides 11 and 12. Optical splitter 13 is, for example, a multimode interference (MMI) splitter. Optical splitter 13 is, for example, a 2×2 MMI splitter. The width of core layer 32 of optical splitter 13 is larger than the width of core layer 32 of each of two first arm waveguides 11 and 12.

Two output ports of optical splitter 13 are connected to two first arm waveguides 11 and 12. One of two input ports of optical splitter 13 is optically coupled to first semiconductor optical amplifier 40. Specifically, an optical waveguide 39 is connected to one of two input ports of optical splitter 13 and to first semiconductor optical amplifier 40. Optical waveguide 39 has the same configuration as each of first arm waveguides 11 and 12.

Optical coupler 14 is formed between two first arm waveguides 11, 12 and second semiconductor optical amplifier 50. Optical coupler 14 combines light propagating through two first arm waveguides 11 and 12 and outputs the combined light toward second semiconductor optical amplifier 50. As shown in FIG. 3, optical coupler 14 is configured in the same manner as optical splitter 13. Optical coupler 14 is formed of the same material and has the same layer structure as optical splitter 13 and the second arm waveguide. Optical coupler 14 is, for example, a MMI coupler. Optical coupler 14 is, for example, a 2×2 MMI coupler. The width of core layer 32 of optical coupler 14 is larger than the width of core layer 32 of each of two first arm waveguides 11 and 12.

Two input ports of optical coupler 14 are connected to two first arm waveguides 11 and 12. One of two output ports of optical coupler 14 is optically coupled to second semiconductor optical amplifier 50. Specifically, optical waveguide 49 is connected to one of two output ports of optical coupler 14 and to second semiconductor optical amplifier 50. Optical waveguide 49 has the same configuration as each of first arm waveguides 11 and 12.

Two child Mach-Zehnder interferometers 20 are respectively connected to two first arm waveguides 11 and 12. Child Mach-Zehnder interferometer 20 connected to first arm waveguide 11 and phase modulation portions 25 and 26 constitute, for example, a Mach-Zehnder-type optical phase modulator for 1 channel. Child Mach-Zehnder interferometer 20 connected to first arm waveguide 12 and phase modulation portions 25 and 26 constitute, for example, a Mach-Zehnder-type optical phase modulator for Q channel. Child Mach-Zehnder interferometers 20 each include two second arm waveguides 21 and 22, an optical splitter 23, and an optical coupler 24.

As shown in FIG. 2, second arm waveguides 21 and 22 each have the same configuration as each of first arm waveguides 11 and 12. Second arm waveguides 21 and 22 are formed of the same material and has the same layer structure as first arm waveguides 11 and 12.

Optical splitter 23 is formed between two second arm waveguides 21, 22 and optical splitter 13. Optical splitter 23 further splits light split by optical splitter 13 and outputs the split light to two second arm waveguides 21 and 22. As shown in FIG. 3, optical splitter 23 is configured in the same manner as optical splitter 13. Optical splitter 23 is, for example, a MMI splitter. Optical splitter 23 is, for example, a 2×2 MMI splitter. Two output ports of optical splitter 23 are connected to two second arm waveguides 21 and 22. One of two input ports of optical splitter 23 is connected to one of two first arm waveguides 11 and 12.

Optical coupler 24 is formed between two second arm waveguides 21, 22 and optical coupler 14. Optical coupler 24 combines light propagating through two second arm waveguides 21 and 22 and outputs the combined light toward optical coupler 14. As shown in FIG. 3, optical coupler 24 is configured in the same manner as optical coupler 14. Optical coupler 24 is, for example, a MMI coupler. Optical coupler 24 is, for example, a 2×2 MMI coupler. Two input ports of optical coupler 24 are connected to two second arm waveguides 21 and 22. One of two output ports of optical coupler 24 is connected to one of two first arm waveguides 11 and 12.

Figure 4:
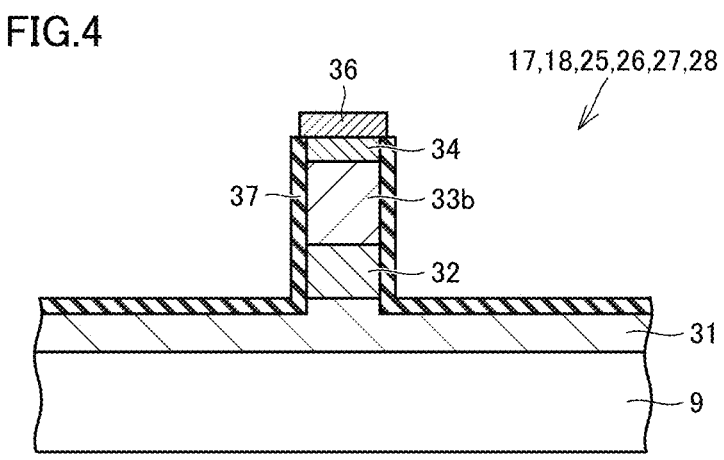
FIG. 4 is a schematic cross-sectional view of a phase modulation portion and a phase adjustment portion in the semiconductor optical phase modulator in the first embodiment.

Phase modulation portions 25 and 26 are provided on two second arm waveguides 21 and 22. Specifically, phase modulation portion 25 is provided on second arm waveguide 21. Phase modulation portion 26 is provided on second arm waveguide 22. As shown in FIG. 4, phase modulation portions 25 and 26 each include a contact layer 34 and an electrode 36 in addition to lower cladding layer 31, core layer 32, and upper cladding layer 33$b$. Phase modulation portions 25 and 26 each may further include insulating protective layer 37. Upper cladding layer 33$b$ of phase modulation portions 25 and 26 is, for example, a p-type InP layer. Contact layer 34 is, for example, a p-type InGaAs layer, AuZn layer, or AuBe layer. Electrode 36 is formed of, for example, a metal such as Ti, Au, Pt, Nb, or Ni. Phase modulation portions 25 and 26 have, for example, a high-mesa structure.

Insulating protective layer 37 is formed on the high-mesa structure. Specifically, insulating protective layer 37 is formed on side surfaces of contact layer 34, on side surfaces of upper cladding layer 33$b$, on side surfaces of core layer 32, and on lower cladding layer 31.

Parent phase adjustment portions 17 and 18 are provided on two first arm waveguides 11 and 12. Specifically, parent phase adjustment portion 17 is provided on first arm waveguide 11. Parent phase adjustment portion 18 is provided on first arm waveguide 12. As shown in FIG. 4, parent phase adjustment portions 17 and 18 have the same configuration as phase modulation portions 25 and 26. Parent phase adjustment portions 17 and 18 are formed of the same material and have the same layer structure as phase modulation portions 25 and 26. For example, phases applied to an I-channel optical signal and a Q-channel optical signal in parent phase adjustment portions 17 and 18 are adjusted so that the phase difference between the I-channel optical signal output from first arm waveguide 11 and the Q-channel optical signal output from first arm waveguide 12 is π/2 at the input port of optical coupler 14.

Child phase adjustment portions 27 and 28 are provided on two second arm waveguides 21 and 22. Specifically, child phase adjustment portion 27 is provided on second arm waveguide 21. Child phase adjustment portion 28 is provided on second arm waveguide 22. As shown in FIG. 4, child phase adjustment portions 27 and 28 have the same configuration as phase modulation portions 25 and 26. Child phase adjustment portions 27 and 28 are formed of the same material and have the same layer structure as phase modulation portions 25 and 26.

First semiconductor optical amplifier 40 is formed between optical phase modulation element 3 and first end face 9$a$ of substrate 9. The light input end of semiconductor optical phase modulator 1 is a light input end face 40$a$ of first semiconductor optical amplifier 40. First semiconductor optical amplifier 40 is optically coupled to input optical fiber 5a. Light input end face 40a of first semiconductor optical amplifier 40 may be flush with first end face 9a of substrate 9. First semiconductor optical amplifier 40 amplifies light input to optical phase modulation element 3.

Figure 5:
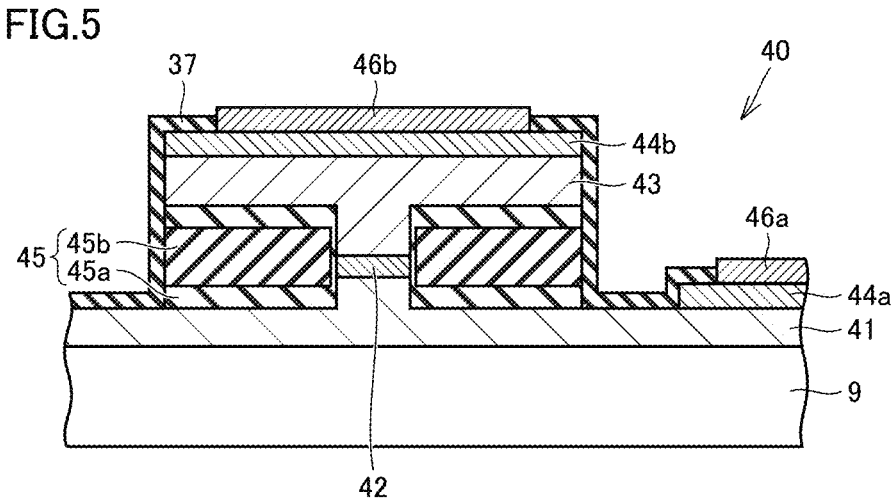
FIG. 5 is a schematic cross-sectional view of a first semiconductor optical amplifier of the semiconductor optical phase modulator in the first embodiment.

As shown in FIG. 5, first semiconductor optical amplifier 40 includes a lower cladding layer 41, a core layer 42, an upper cladding layer 43, a current block layer 45, contact layers 44a and 44b, and electrodes 46a and 46b. First semiconductor optical amplifier 40 may further include insulating protective layer 37.

Lower cladding layer 41 is formed on substrate 9. Lower cladding layer 41 is, for example, an n-type InP layer. Core layer 42 is formed on lower cladding layer 41. The refractive index of core layer 42 is greater than the refractive index of lower cladding layer 41 and greater than the refractive index of upper cladding layer 43. Core layer 42 is formed of, for example, a semiconductor material such as AlGaInAs. Core layer 42 has, for example, a multiple quantum well (MQW) structure. The thickness of core layer 42 of first semiconductor optical amplifier 40 is smaller than the thickness of core layer 32 of optical phase modulation element 3. The number of well layers in core layer 42 of first semiconductor optical amplifier 40 is smaller than the number of well layers in core layer 32 of optical phase modulation element 3. The optical confinement factor of first semiconductor optical amplifier 40 is therefore smaller than the optical confinement factor of optical phase modulation element 3. Upper cladding layer 43 is, for example, a p-type InP layer. First semiconductor optical amplifier 40 has, for example, a high-mesa structure.

Current block layer 45 is formed on both side surfaces of core layer 42. Current block layer 45 concentrates current flowing between electrodes 46a and 46b in core layer 42. Current block layer 45 includes, for example, a p-type semiconductor layer 45a such as p-type InP and an n-type semiconductor layer 45b such as n-type InP. Current block layer 45 may be a semi-insulating layer such as an Fe-doped InP layer. Contact layers 44a and 44b are, for example, an n-type InGaAs layer, AuZn layer, or AuBe layer. Electrodes 46a and 46b are formed of, for example, a metal such as Ti, Au, Pt, Nb, or Ni.

Insulating protective layer 37 is formed on the high-mesa structure. Specifically, insulating protective layer 37 is formed on contact layers 44a and 44b, on side surfaces of upper cladding layer 43, on side surfaces of current block layer 45, and on lower cladding layer 41.

Second semiconductor optical amplifier 50 is formed between optical phase modulation element 3 and second end face 9b of substrate 9. The light output end of semiconductor optical phase modulator 1 is a light output end face 50a of second semiconductor optical amplifier 50. Second semiconductor optical amplifier 50 is optically coupled to output optical fiber 5b. Light output end face 50a of second semiconductor optical amplifier 50 may be flush with second end face 9b of substrate 9. Second semiconductor optical amplifier 50 amplifies modulated signal light output from optical phase modulation element 3.

Figure 6:
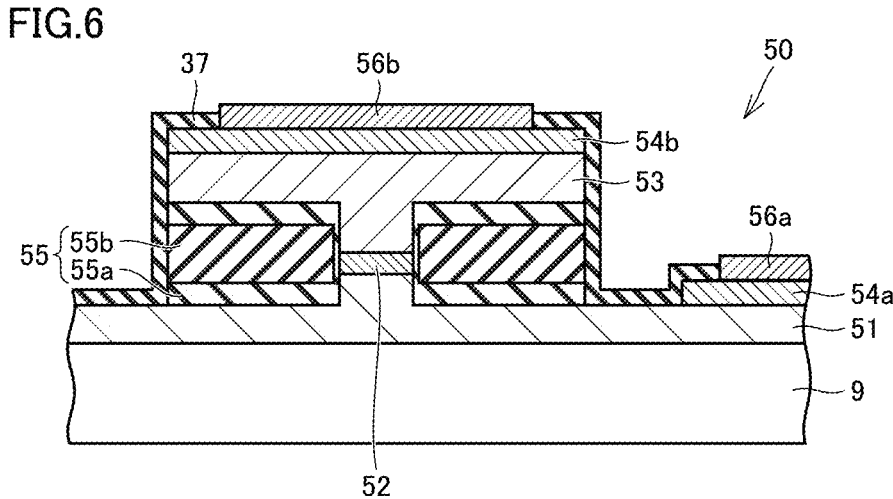
FIG. 6 is a schematic cross-sectional view of a second semiconductor optical amplifier of the semiconductor optical phase modulator in the first embodiment.

Second semiconductor optical amplifier 50 is configured in the same manner as first semiconductor optical amplifier 40. Specifically, as shown in FIG. 6, second semiconductor optical amplifier 50 includes a lower cladding layer 51, a core layer 52, an upper cladding layer 53, a current block layer 55, contact layers 54a and 54b, and electrodes 56a and 56b. Current block layer 55 includes, for example, a p-type semiconductor layer 55a such as p-type InP and an n-type semiconductor layer 55b such as n-type InP. Current block layer 55 may be a semi-insulating layer such as an Fe-doped InP layer. Second semiconductor optical amplifier 50 may further include insulating protective layer 37. Core layer 42 of first semiconductor optical amplifier 40 and core layer 52 of second semiconductor optical amplifier 50 may be formed of the same material and have the same layer structure.

The thickness of core layer 52 of second semiconductor optical amplifier 50 is smaller than the thickness of core layer 32 of optical phase modulation element 3. The number of well layers in core layer 52 of second semiconductor optical amplifier 50 is smaller than the number of well layers in core layer 32 of optical phase modulation element 3. The optical confinement factor of core layer 52 of second semiconductor optical amplifier 50 is therefore smaller than the optical confinement factor of core layer 32 of optical phase modulation element 3.

A second length of second semiconductor optical amplifier 50 may be shorter than a first length of first semiconductor optical amplifier 40. As used herein the first length of first semiconductor optical amplifier 40 means the length between light input end face 40a of first semiconductor optical amplifier 40 and the light output end face of first semiconductor optical amplifier 40, and the second length of second semiconductor optical amplifier 50 means the length between the light input end face of second semiconductor optical amplifier 50 and light output end face 50a of second semiconductor optical amplifier 50.

In general, the carrier density in a semiconductor optical amplifier varies depending on the intensity distribution of light entering the semiconductor optical amplifier. The intensity distribution of light entering the semiconductor optical amplifier means the intensity distribution of light in a cross section perpendicular to the direction of travel of light. Variation in carrier density in the semiconductor optical amplifier changes the refractive index in the semiconductor optical amplifier and causes a phase distortion in light amplified by the semiconductor optical amplifier. The second length of second semiconductor optical amplifier 50 that light with a larger intensity enters is set to be shorter than the first length of first semiconductor optical amplifier 40, whereby a phase distortion applied by second semiconductor optical amplifier 50 to the modulated signal light output from optical phase modulation element 3 can be reduced.

Figure 7:
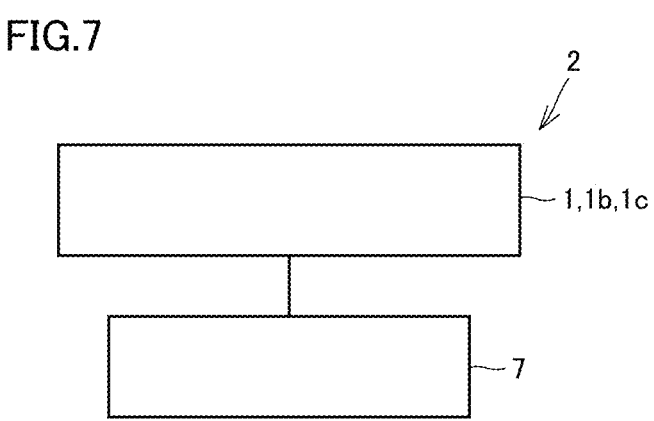
FIG. 7 is a control block diagram of a semiconductor optical phase modulation device in the first embodiment.

Referring to FIG. 7, an optical phase modulation device 2 includes semiconductor optical phase modulator 1 and a controller 7. Semiconductor optical phase modulator 1 is connected to controller 7. Controller 7 can control a voltage applied to phase modulation portions 25 and 26, a voltage applied to parent phase adjustment portions 17 and 18, a voltage applied to child phase adjustment portions 27 and 28, a current injected into first semiconductor optical amplifier 40, a current injected into second semiconductor optical amplifier 50, a voltage applied to first semiconductor optical amplifier 40, and a voltage applied to second semiconductor optical amplifier 50. Controller 7 can determine whether semiconductor optical phase modulator 1 is non-defective by comparing the intensity of test light detected in the other of first semiconductor optical amplifier 40 and second semiconductor optical amplifier 50 with a reference light intensity. Controller 7 is, for example, a microcomputer including a processor or an electronic circuit.

The operation of semiconductor optical phase modulator 1 in the present embodiment will be described.

First semiconductor optical amplifier 40 amplifies light input to semiconductor optical phase modulator 1. The refractive index of core layer 32 of phase modulation portions 25 and 26 is changed by applying a high-frequency electrical signal to phase modulation portions 25 and 26. Child Mach-Zehnder interferometer 20 connected to first arm waveguide 11 outputs an I-channel optical signal. Child Mach-Zehnder interferometer 20 connected to first arm waveguide 12 outputs a Q-channel optical signal. Optical coupler 14 combines the I-channel optical signal and the Q-channel optical signal. Optical phase modulation element 3 outputs modulated signal light toward second semiconductor optical amplifier 50. Second semiconductor optical amplifier 50 amplifies the modulated signal light. Semiconductor optical phase modulator 1 thus outputs the modulated signal light.

Figure 8:
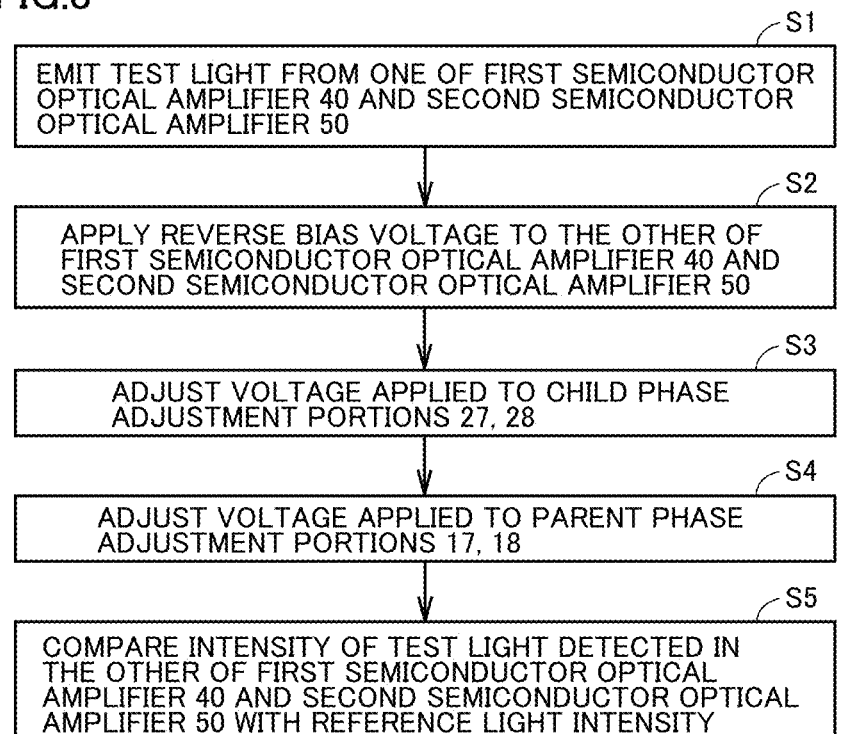
FIG. 8 is a flowchart of a method of testing the semiconductor optical phase modulator in the first embodiment.

Referring to FIG. 8, a method of testing semiconductor optical phase modulator 1 in the first embodiment will be described.

The method of testing semiconductor optical phase modulator 1 in the present embodiment includes emitting test light from one of first semiconductor optical amplifier 40 and second semiconductor optical amplifier 50 (S1), applying a reverse bias voltage to the other of first semiconductor optical amplifier 40 and second semiconductor optical amplifier 50 (S2), and comparing the intensity of test light detected in the other of first semiconductor optical amplifier 40 and second semiconductor optical amplifier 50 with a reference light intensity (S5). When semiconductor optical phase modulator 1 includes parent phase adjustment portions 17 and 18 and child phase adjustment portions 27 and 28, the method of testing semiconductor optical phase modulator 1 in the present embodiment further includes adjusting a voltage applied to child phase adjustment portions 27 and 28 (S3), and adjusting a voltage applied to parent phase adjustment portions 17 and 18 (S4).

At step S1, for example, a forward bias voltage is applied to one of first semiconductor optical amplifier 40 and second semiconductor optical amplifier 50. One of first semiconductor optical amplifier 40 and second semiconductor optical amplifier 50 emits amplified spontaneous emission light (ASE light). This ASE light is used as test light, and one of first semiconductor optical amplifier 40 and second semiconductor optical amplifier 50 is used as a light source of test light.

At step S2, a reverse bias voltage is applied to the other of first semiconductor optical amplifier 40 and second semiconductor optical amplifier 50. The other of first semiconductor optical amplifier 40 and second semiconductor optical amplifier 50 functions as a photodiode that detects the intensity of test light. Either step S2 or step S1 may be performed first.

At step S3, a voltage applied to child phase adjustment portions 27 and 28 is adjusted. For example, controller 7 adjusts a voltage applied to child phase adjustment portions 27 and 28 such that the intensity of test light detected in the other of first semiconductor optical amplifier 40 and second semiconductor optical amplifier 50 is maximized.

At step S4, a voltage applied to parent phase adjustment portions 17 and 18 is adjusted. For example, controller 7 adjusts a voltage applied to parent phase adjustment portions 17 and 18 such that the intensity of test light detected in the other of first semiconductor optical amplifier 40 and second semiconductor optical amplifier 50 is maximized. Step S3 and step S4 may be repeatedly performed.

At step S5, controller 7 compares the intensity of test light detected in the other of first semiconductor optical amplifier 40 and second semiconductor optical amplifier 50 with a reference light intensity. For example, when the intensity of test light is equal to or greater than a reference light intensity, controller 7 determines that semiconductor optical phase modulator 1 is non-defective. On the other hand, when the intensity of test light is less than a reference light intensity, controller 7 determines that semiconductor optical phase modulator 1 is defective.

The effects of semiconductor optical phase modulator 1 and the method of testing the same in the present embodiment will be described.

Semiconductor optical phase modulator 1 in the present embodiment includes optical phase modulation element 3, first semiconductor optical amplifier 40 to amplify light input to optical phase modulation element 3, and second semiconductor optical amplifier 50 to amplify modulated signal light output from optical phase modulation element 3. First semiconductor optical amplifier 40 includes a first core layer (core layer 42) having a first multiple quantum well structure. Optical phase modulation element 3 includes a second core layer (core layer 32) having a second multiple quantum well structure. Second semiconductor optical amplifier 50 includes a third core layer (core layer 52) having a third multiple quantum well structure. A first thickness of the first core layer is smaller than a second thickness of the second core layer. A first number of well layers of the first multiple quantum well structure is smaller than a second number of well layers of the second multiple quantum well structure. A third thickness of the third core layer is smaller than the second thickness of the second core layer. A third number of well layers of the third multiple quantum well structure is smaller than the second number of well layers of the second multiple quantum well structure. The light input end of semiconductor optical phase modulator 1 is light input end face 40a of first semiconductor optical amplifier 40. The light output end of semiconductor optical phase modulator 1 is light output end face 50a of second semiconductor optical amplifier 50.

Therefore, the optical confinement factor of first semiconductor optical amplifier 40 is smaller than the optical confinement factor of optical phase modulation element 3, and the optical confinement factor of second semiconductor optical amplifier 50 is smaller than the optical confinement factor of optical phase modulation element 3. The mode field diameter of light in each of first semiconductor optical amplifier 40 and second semiconductor optical amplifier 50 is increased. The optical coupling loss between semiconductor optical phase modulator 1 and input optical fiber 5a and the optical coupling loss between semiconductor optical phase modulator 1 and output optical fiber 5b can be reduced.

Semiconductor optical phase modulator 1 in the present embodiment further includes substrate 9 on which optical phase modulation element 3, first semiconductor optical amplifier 40, and second semiconductor optical amplifier 50 are mounted. Light input end face 40a of first semiconductor optical amplifier 40 is flush with first end face 9a of substrate 9. Light output end face 50a of second semiconductor optical amplifier 50 is flush with second end face 9b of substrate 9 different from first end face 9a. Therefore, the optical coupling loss between semiconductor optical phase modulator 1 and input optical fiber 5a and the optical coupling loss between semiconductor optical phase modulator 1 and output optical fiber 5b can be reduced.

In semiconductor optical phase modulator 1 in the present embodiment, the second length of second semiconductor optical amplifier 50 is shorter than the first length of first semiconductor optical amplifier 40. Therefore, a phase distortion applied by second semiconductor optical amplifier 50 to modulated signal light output from optical phase modulation element 3 can be reduced. Semiconductor optical phase modulator 1 can output phase modulated signal light with higher quality.

In semiconductor optical phase modulator 1 in the present embodiment, the first core layer (core layer 42) and the third core layer (core layer 52) are formed of the same material and have the same layer structure. Therefore, the core layer of semiconductor optical phase modulator 1 is formed of two kinds of core materials. Since the kinds of core layer of semiconductor optical phase modulator 1 are reduced, the cost of semiconductor optical phase modulator 1 can be reduced.

In semiconductor optical phase modulator 1 in the present embodiment, optical phase modulation element 3 includes parent Mach-Zehnder interferometer 10, two child Mach-Zehnder interferometers 20, and phase modulation portions 25 and 26. Parent Mach-Zehnder interferometer 10 includes two first arm waveguides 11 and 12. Two child Mach-Zehnder interferometers 20 are respectively connected to two first arm waveguides 11 and 12, and two child Mach-Zehnder interferometers 20 each include two second arm waveguides 21 and 22. Phase modulation portions 25 and 26 are provided on two second arm waveguides 21 and 22. Semiconductor optical phase modulator 1 therefore can output a multiple phase modulated signal such as QPSK.

In semiconductor optical phase modulator 1 in the present embodiment, optical phase modulation element 3 further includes parent phase adjustment portions 17 and 18 and child phase adjustment portions 27 and 28. Parent phase adjustment portions 17 and 18 are provided on two first arm waveguides 11 and 12. Child phase adjustment portions 27 and 28 are provided on two second arm waveguides 21 and 22. Semiconductor optical phase modulator 1 therefore can output a multiple phase modulated signal with higher quality.

The method of testing semiconductor optical phase modulator 1 in the present embodiment includes applying a forward bias voltage to one of first semiconductor optical amplifier 40 and second semiconductor optical amplifier 50 to emit test light from one of first semiconductor optical amplifier 40 and second semiconductor optical amplifier 50 (S1), applying a reverse bias voltage to the other of first semiconductor optical amplifier 40 and second semiconductor optical amplifier 50 (S2), and comparing the intensity of test light detected in the other of first semiconductor optical amplifier 40 and second semiconductor optical amplifier 50 with a reference light intensity (S5).

In the method of testing semiconductor optical phase modulator 1 in the present embodiment, it is not necessary to prepare a test light source, an input optical fiber, an output optical fiber, and a power meter separately from semiconductor optical phase modulator 1, and it is not necessary to align a test light source, an input optical fiber, an output optical fiber, and a power meter to semiconductor optical phase modulator 1. Therefore, the test time for semiconductor optical phase modulator 1 can be shortened.

Second Embodiment

Referring to FIG. 9 to FIG. 12, a semiconductor optical phase modulator 1b in a second embodiment will be described. Semiconductor optical phase modulator 1b in the present embodiment has a configuration similar to semiconductor optical phase modulator 1 in the first embodiment but differs mainly in the following points.

Figure 9:
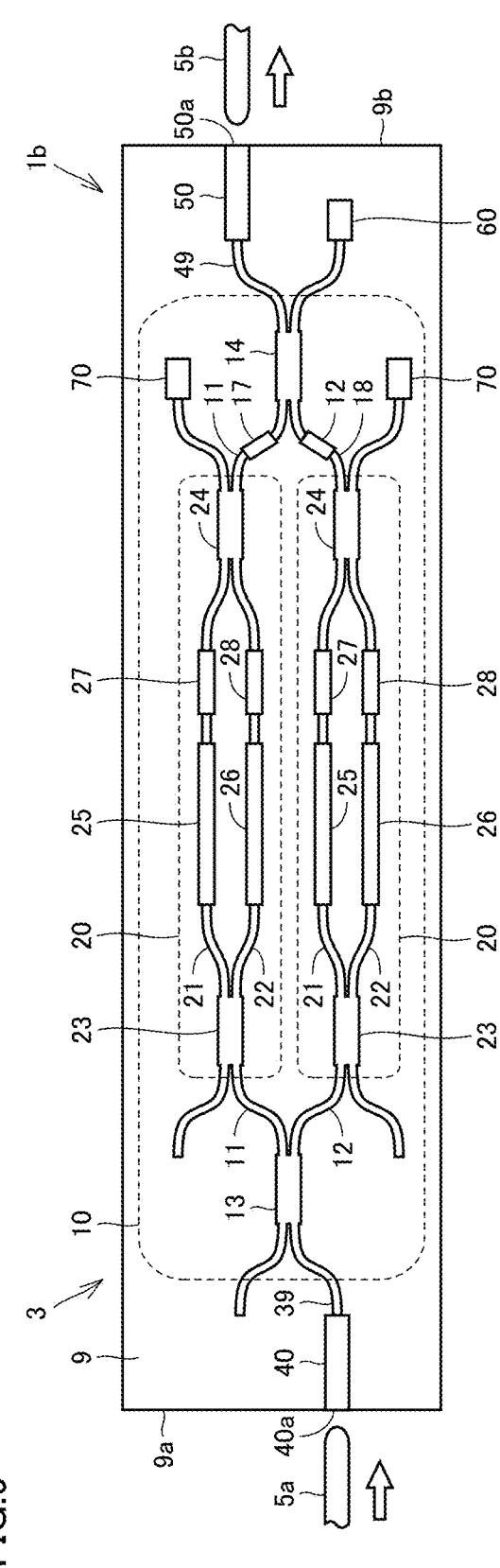
FIG. 9 is a schematic plan view of a semiconductor optical phase modulator in a second embodiment.

Referring to FIG. 9, semiconductor optical phase modulator 1b further includes a monitoring photodiode 60 and monitoring photodiodes 70. Monitoring photodiode 60 is optically coupled to the other of two output ports of optical coupler 14. Monitoring photodiodes 70 are each optically coupled to the other of two output ports of optical coupler 24.

Figure 10:
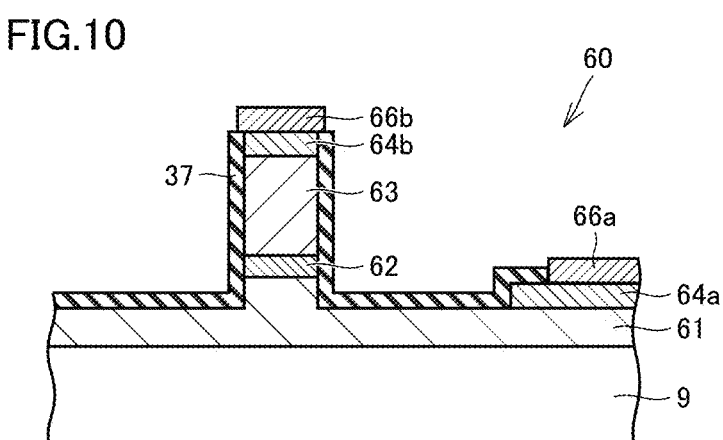
FIG. 10 is a schematic cross-sectional view of a monitoring photodiode of the semiconductor optical phase modulator in the second embodiment.

Referring to FIG. 10, monitoring photodiode 60 includes a lower cladding layer 61, a light absorption layer 62, an upper cladding layer 63, contact layers 64a and 64b, and electrodes 66a and 66b. Monitoring photodiode 60 may further include insulating protective layer 37.

Lower cladding layer 61 is formed on substrate 9. Lower cladding layer 61 is, for example, an n-type InP layer. The refractive index of light absorption layer 62 is greater than the refractive index of lower cladding layer 61 and greater than the refractive index of upper cladding layer 63. Light absorption layer 62 is formed of, for example, a semiconductor material such as AlGaInAs. Light absorption layer 62 has, for example, a multiple quantum well (MQW) structure. Light absorption layer 62 of monitoring photodiode 60 may be formed of the same material and have the same layer structure as core layer 42 of first semiconductor optical amplifier 40 and core layer 52 of second semiconductor optical amplifier 50. Upper cladding layer 63 is, for example, a p-type InP layer. Monitoring photodiode 60 has, for example, a high-mesa structure.

Contact layers 64a and 64b are, for example, an n-type InGaAs layer, AuZn layer, or AuBe layer. Electrodes 66a and 66b are formed of, for example, a metal such as Ti, Au, Pt, Nb, or Ni. Insulating protective layer 37 is formed on the high-mesa structure. Specifically, insulating protective layer 37 is formed on contact layers 64a and 64b, on side surfaces of upper cladding layer 63, and on lower cladding layer 61.

Figure 11:
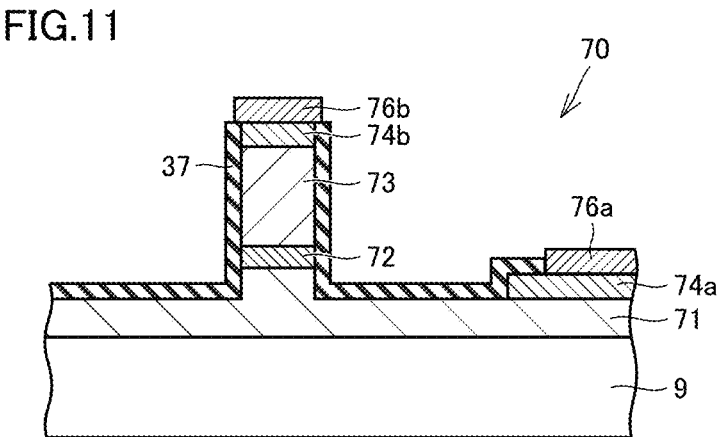
FIG. 11 is a schematic cross-sectional view of a monitoring photodiode of the semiconductor optical phase modulator in the second embodiment.

Referring to FIG. 11, monitoring photodiodes 70 have the same configuration as monitoring photodiode 60. Specifically, monitoring photodiodes 70 each include a lower cladding layer 71, a light absorption layer 72, an upper cladding layer 73, contact layers 74a and 74b, and electrodes 76a and 76b. Monitoring photodiode 70 may further include insulating protective layer 37. Light absorption layer 72 of monitoring photodiode 70 is formed of the same material and has the same layer structure as light absorption layer 62 of monitoring photodiode 60. Light absorption layer 72 of monitoring photodiode 70 may be formed of the same material and have the same layer structure as core layer 42 of first semiconductor optical amplifier 40 and core layer 52 of second semiconductor optical amplifier 50.

Referring to FIG. 7, optical phase modulation device 2 in the present embodiment is similar to optical phase modulation device 2 in the first embodiment but includes semiconductor optical phase modulator 1b instead of semiconductor optical phase modulator 1. Controller 7 can receive a signal on the intensity of test light from monitoring photodiodes 60 and 70.

Referring to FIG. 12, a method of testing semiconductor optical phase modulator 1b in the second embodiment will be described. The method of testing semiconductor optical phase modulator 1b in the present embodiment includes steps similar to those of the method of testing semiconductor optical phase modulator 1 in the first embodiment but differs mainly in the following points. The method of testing semiconductor optical phase modulator 1b in the present embodiment further includes applying a reverse bias voltage to monitoring photodiodes 60 and 70 (S12). In the method of testing semiconductor optical phase modulator 1b in the present embodiment, application of a reverse bias voltage to the other of first semiconductor optical amplifier 40 and second semiconductor optical amplifier 50 (S2) is performed after adjusting a voltage applied to parent phase adjustment portions 17 and 18 (S4).

Specifically, step S1 in the present embodiment is the same as step S1 in the embodiment. One of first semiconductor optical amplifier 40 and second semiconductor optical amplifier 50 functions as a light source of test light.

At step S12, a reverse bias voltage is applied to monitoring photodiodes 60 and 70. Monitoring photodiodes 60 and 70 can detect test light emitted from one of first semiconductor optical amplifier 40 and second semiconductor optical amplifier 50.

At step S3, a voltage applied to child phase adjustment portions 27 and 28 is adjusted. For example, controller 7 adjusts a voltage applied to child phase adjustment portions 27 and 28 such that the intensity of test light detected in monitoring photodiode 70 is maximized.

At step S4, a voltage applied to parent phase adjustment portions 17 and 18 is adjusted. For example, controller 7 adjusts a voltage applied to parent phase adjustment portions 17 and 18 such that the intensity of test light detected in monitoring photodiode 60 is maximized.

Step S2 is performed after step S4. At step S2, a reverse bias voltage is applied to the other of first semiconductor optical amplifier 40 and second semiconductor optical amplifier 50. Therefore, the other of first semiconductor optical amplifier 40 and second semiconductor optical amplifier 50 functions as a photodiode that detects test light.

Step S5 is performed following step S2. Step S5 in the present embodiment is the same as step S5 in the embodiment.

The effects of semiconductor optical phase modulator 1b in the present embodiment will be described.

Semiconductor optical phase modulator 1b in the present embodiment includes a first monitoring photodiode (monitoring photodiode 60) and a second monitoring photodiode (monitoring photodiode 70). Parent Mach-Zehnder interferometer 10 includes a first 2×2 optical coupler (optical coupler 14) including a first light output port and a second light output port. The first light output port is optically coupled to second semiconductor optical amplifier 50. The second light output port is optically coupled to the first monitoring photodiode. Two child Mach-Zehnder interferometers 20 each include a second 2×2 optical coupler (optical coupler 24) including a third light output port and a fourth light output port. The third light output port is connected to one of two first arm waveguides 11 and 12 of parent Mach-Zehnder interferometer 10. The fourth light output port is optically coupled to the second monitoring photodiode.

Therefore, parent phase adjustment portions 17 and 18 can be adjusted based on the intensity of detected light detected in the first monitoring photodiode (monitoring photodiode 60). Child phase adjustment portions 27 and 28 can be adjusted based on the intensity of detected light detected in the second monitoring photodiode (monitoring photodiode 70). Parent phase adjustment portions 17, 18 and child phase adjustment portions 27, 28 can be adjusted independently of each other. Parent phase adjustment portions 17 and 18 can adjust the optical path lengths of two first arm waveguides 11 and 12 more accurately, and child phase adjustment portions 27 and 28 can adjust the optical path lengths of two second arm waveguides 21 and 22 more accurately. Semiconductor optical phase modulator 1b can output phase modulated signal light with higher quality.

In semiconductor optical phase modulator 1b in the present embodiment, the first monitoring photodiode (monitoring photodiode 60) includes a first light absorption layer (light absorption layer 62) having a fourth multiple quantum well structure. The second monitoring photodiode (monitoring photodiode 70) includes a second light absorption layer (light absorption layer 72) having a fifth multiple quantum well structure. The first core layer (core layer 42), the third core layer (core layer 52), the first light absorption layer, and the second light absorption layer are formed of the same material and have the same layer structure. Therefore, the kinds of core layer and light absorption layer of semiconductor optical phase modulator 1b are reduced. The cost of semiconductor optical phase modulator 1b can be reduced.

Third Embodiment

Figure 13:
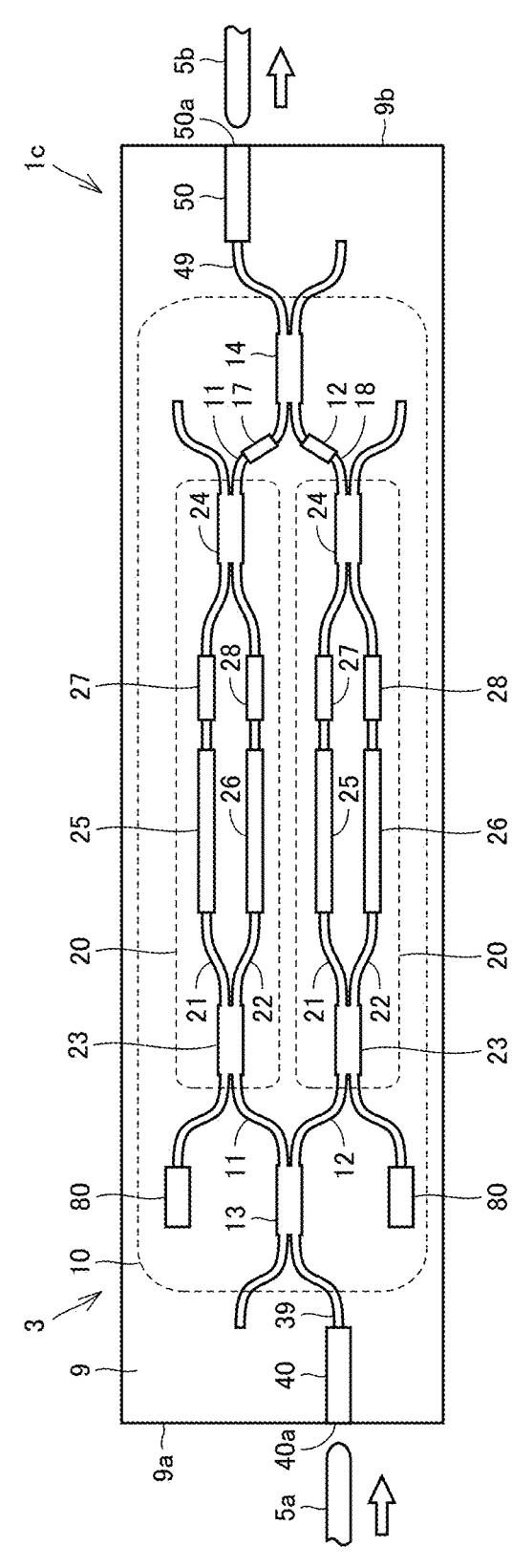
FIG. 13 is a schematic plan view of a semiconductor optical phase modulator in a third embodiment.
Figure 14:
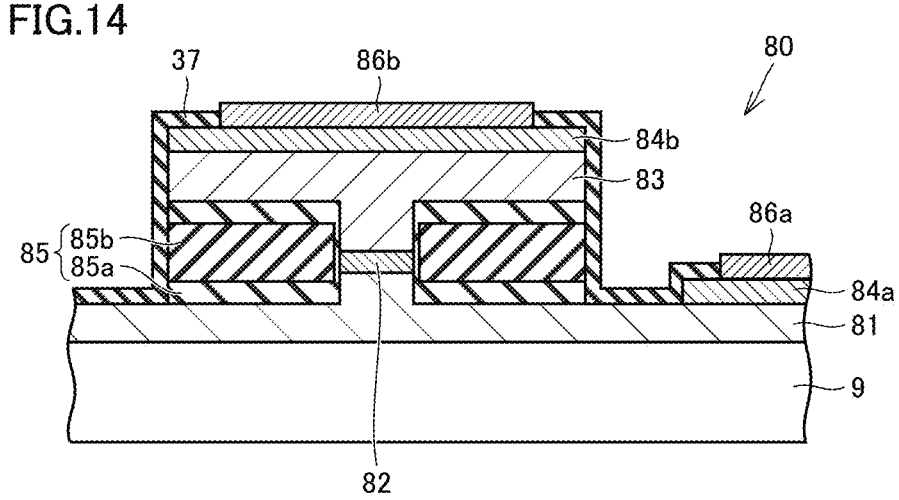
FIG. 14 is a schematic cross-sectional view of a third semiconductor optical amplifier of the semiconductor optical phase modulator in the third embodiment.

Referring to FIG. 13 and FIG. 14, a semiconductor optical phase modulator 1c in a third embodiment will be described. Semiconductor optical phase modulator 1c in the present embodiment has a configuration similar to semiconductor optical phase modulator 1 in the first embodiment but differs mainly in the following points.

Semiconductor optical phase modulator 1c further includes a third semiconductor optical amplifier 80. The other of two input ports of optical splitter 23 is optically coupled to third semiconductor optical amplifier 80.

Third semiconductor optical amplifier 80 is configured in the same manner as first semiconductor optical amplifier 40 and second semiconductor optical amplifier 50. Specifically, as shown in FIG. 14, third semiconductor optical amplifier 80 includes a lower cladding layer 81, a core layer 82, an upper cladding layer 83, a current block layer 85, contact layers 84a and 84b, and electrodes 86a and 86b. Current block layer 85 includes, for example, a p-type semiconductor layer 85a such as p-type InP and an n-type semiconductor layer 85b such as n-type InP. Current block layer 85 may be a semi-insulating layer such as an Fe-doped InP layer. Third semiconductor optical amplifier 80 may further include insulating protective layer 37. Core layer 82 of third semiconductor optical amplifier 80 may be formed of the same material and have the same layer structure as core layer 42 of first semiconductor optical amplifier 40 and core layer 52 of second semiconductor optical amplifier 50.

Figure 15:
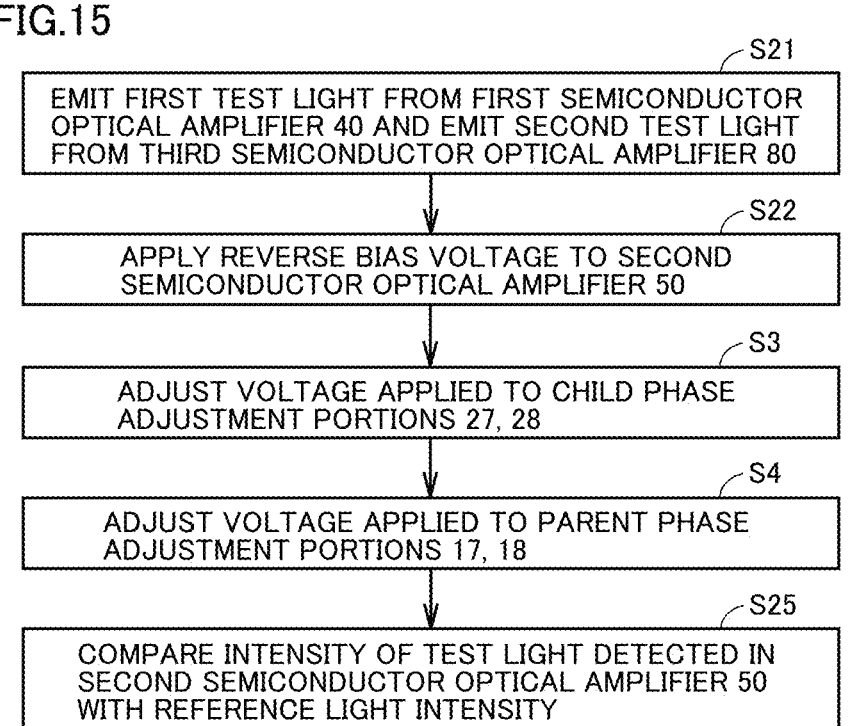
FIG. 15 is a flowchart of a method of testing the semiconductor optical phase modulator in the third embodiment.

Referring to FIG. 15, a method of testing semiconductor optical phase modulator 1c in the third embodiment will be described. The method of testing semiconductor optical phase modulator 1c in the present embodiment includes steps similar to those of the method of testing semiconductor optical phase modulator 1 in the first embodiment but differs mainly in the following points.

Referring to FIG. 7, optical phase modulation device 2 in the present embodiment is similar to optical phase modulation device 2 in the first embodiment but includes semiconductor optical phase modulator 1c instead of semiconductor optical phase modulator 1. Controller 7 can further control a current injected into third semiconductor optical amplifier 80.

The method of testing semiconductor optical phase modulator 1c in the present embodiment includes emitting first test light from first semiconductor optical amplifier 40 and emitting second test light from third semiconductor optical amplifier 80 (S21), applying a reverse bias voltage to second semiconductor optical amplifier 50 (S22), and comparing the intensity of test light detected in second semiconductor optical amplifier 50 with a reference light intensity (S25). The intensity of test light is the sum of a first intensity of the first test light and a second intensity of the second test light.

When semiconductor optical phase modulator 1c includes parent phase adjustment portions 17 and 18 and child phase adjustment portions 27 and 28, the method of testing semiconductor optical phase modulator 1c in the present embodiment further includes adjusting a voltage applied to child phase adjustment portions 27 and 28 (S3), and adjusting a voltage applied to parent phase adjustment portions 17 and 18 (S4).

Specifically, at step S21, a forward bias voltage is applied to first semiconductor optical amplifier 40 and third semiconductor optical amplifier 80. First semiconductor optical amplifier 40 and third semiconductor optical amplifier 80 output ASE light. The ASE light emitted from first semiconductor optical amplifier 40 is used as first test light, and first semiconductor optical amplifier 40 functions as a first light source of the first test light. The ASE light emitted from third semiconductor optical amplifier 80 is used as second test light, and third semiconductor optical amplifier 80 functions as a second light source of the second test light.

At step S22, a reverse bias voltage is applied to second semiconductor optical amplifier 50. Second semiconductor optical amplifier 50 functions as a photodiode that detects the intensity of test light. The intensity of test light is the sum of a first intensity of the first test light and a second intensity of the second test light.

At step S3, a voltage applied to child phase adjustment portions 27 and 28 is adjusted. Specifically, controller 7 adjusts a voltage applied to child phase adjustment portions 27 and 28 such that the intensity of test light detected in second semiconductor optical amplifier 50 is maximized.

At step S4, a voltage applied to parent phase adjustment portions 17 and 18 is adjusted. Specifically, controller 7 adjusts a voltage applied to parent phase adjustment portions 17 and 18 such that the intensity of test light detected in second semiconductor optical amplifier 50 is maximized. Step S3 and step S4 may be repeatedly performed.

At step S25, controller 7 compares the intensity of test light detected in second semiconductor optical amplifier 50 with a reference light intensity. For example, when the intensity of test light is equal to or greater than a reference light intensity, controller 7 determines that semiconductor optical phase modulator 1c is non-defective. On the other hand, when the intensity of test light is less than a reference light intensity, controller 7 determines that semiconductor optical phase modulator 1c is defective.

The effects of semiconductor optical phase modulator 1c and the method of testing the same in the present embodiment will be described.

Semiconductor optical phase modulator 1c in the present embodiment further includes third semiconductor optical amplifier 80. Two child Mach-Zehnder interferometers 20 each include a second 2×2 optical splitter (optical splitter 23) including a third light input port and a fourth light input port. The third light input port is connected to one of two first arm waveguides 11 and 12 of parent Mach-Zehnder interferometer 10. The fourth light input port is optically coupled to third semiconductor optical amplifier 80.

Test light is supplied not only from first semiconductor optical amplifier 40 but also from third semiconductor optical amplifier 80. The light intensity of test light detected in second semiconductor optical amplifier 50 that can function as a photodiode is increased. Semiconductor optical phase modulator 1c can be tested with higher accuracy.

The method of testing semiconductor optical phase modulator 1c in the present embodiment includes applying a forward bias voltage to first semiconductor optical amplifier 40 and third semiconductor optical amplifier 80 to emit first test light from first semiconductor optical amplifier 40 and emit second test light from third semiconductor optical amplifier 80 (S21), applying a reverse bias voltage to second semiconductor optical amplifier 50 (S22), and comparing the intensity of test light detected in second semiconductor optical amplifier 50 with a reference light intensity (S25). The intensity of test light is the sum of a first intensity of the first test light and a second intensity of the second test light.

Test light is supplied not only from first semiconductor optical amplifier 40 but also from third semiconductor optical amplifier 80. The light intensity of test light detected in second semiconductor optical amplifier 50 that can function as a photodiode is increased. Semiconductor optical phase modulator 1c can be tested with higher accuracy.

The first to third embodiments disclosed here should be understood as being illustrative rather than being limitative in all respects. At least two of the first to third embodiments disclosed herein may be combined in a consistent manner. The scope of the present disclosure is shown not in the foregoing description but in the claims, and it is intended that all modifications that come within the meaning and range of equivalence to the claims are embraced here.

REFERENCE SIGNS LIST 1, 1b, 1c semiconductor optical phase modulator, 2 optical phase modulation device, 3 optical phase modulation element, 5a input optical fiber, 5b output optical fiber, 7 controller, 9 substrate, 9a first end face, 9b second end face, 10 parent Mach-Zehnder interferometer, 11, 12 first arm waveguide, 13, 23 optical splitter, 14, 24 optical coupler, 17, 18 parent phase adjustment portion, 20 child Mach-Zehnder interferometer, 21, 22 second arm waveguide, 25, 26 phase modulation portion, 27, 28 child phase adjustment portion, 31, 41, 51, 61, 71, 81 lower cladding layer 32, 42, 52, 82 core layer, 33, 33b, 43, 53, 63, 73, 83 upper cladding layer, 34, 44a, 44b, 54a, 54b, 64a, 64b, 74a, 74b, 84a, 84b contact layer, 36, 46a, 46b, 56a, 56b, 66a, 66b, 76a, 76b, 86a, 86b electrode, 37 insulating protective layer, 39, 49 optical waveguide, 40 first semiconductor optical amplifier, 40a light input end face, 45, 55, 65, 75, 85 current block layer, 45a, 55a, 85a p-type semiconductor layer, 45b, 55b, 85b n-type semiconductor layer, 50 second semiconductor optical amplifier, 50a light output end face, 60, 70 monitoring photodiode, 62, 72 light absorption layer, 80 third semiconductor optical amplifier.

The invention claimed is:

1. A semiconductor optical phase modulator comprising:
   an optical phase modulation element;
   a first semiconductor optical amplifier to amplify light input to the optical phase modulation element;
   a second semiconductor optical amplifier to amplify modulated signal light output from the optical phase modulation element;
   a first monitoring photodiode; and
   a second monitoring photodiode, wherein the first semiconductor optical amplifier includes a first core layer having a first multiple quantum well structure,
   the optical phase modulation element includes a second core layer having a second multiple quantum well structure,
   the second semiconductor optical amplifier includes a third core layer having a third multiple quantum well structure,
   a first thickness of the first core layer is smaller than a second thickness of the second core layer,

17

18 a first number of well layers of the first multiple quantum well structure is smaller than a second number of well layers of the second multiple quantum well structure, a third thickness of the third core layer is smaller than the second thickness of the second core layer, a third number of well layers of the third multiple quantum well structure is smaller than the second number of well layers of the second multiple quantum well structure, a light input end of the semiconductor optical phase modulator is a light input end face of the first semiconductor optical amplifier, a light output end of the semiconductor optical phase modulator is a light output end face of the second semiconductor optical amplifier, the optical phase modulation element includes a parent Mach-Zehnder interferometer, two child Mach-Zehnder interferometers, a phase modulation portion, a parent phase adjustment portion, and a child phase adjustment portion, the parent Mach-Zehnder interferometer includes: two first arm waveguides; and a first 2×2 optical coupler including a first light output port and a second light output port, the two child Mach-Zehnder interferometers are respectively inserted in and connected to the two first arm waveguides, and the two child Mach-Zehnder interferometers each include: two second arm waveguides; and a second 2×2 optical coupler including a third light output port and a fourth light output port, the first semiconductor optical amplifier is connected to the parent Mach-Zehnder interferometer, the phase modulation portion is provided on the two second arm waveguides, the parent phase adjustment portion is provided on the two first arm waveguides, the child phase adjustment portion is provided on the two second arm waveguides, the first light output port is optically coupled to the second semiconductor optical amplifier, the second light output port is optically coupled to the first monitoring photodiode, the two third light output ports are connected respectively to the two first arm waveguides of the parent Mach-Zehnder interferometer, and the two fourth light output ports are optically coupled respectively to the second monitoring photodiodes that are different from each other.

2. The semiconductor optical phase modulator according to claim 1, further comprising a substrate on which the optical phase modulation element, the first semiconductor optical amplifier, and the second semiconductor optical amplifier are mounted, the light input end face of the first semiconductor optical amplifier is flush with a first end face of the substrate, and the light output end face of the second semiconductor optical amplifier is flush with a second end face of the substrate different from the first end face.

3. The semiconductor optical phase modulator according to claim 1, wherein a length of the second semiconductor optical amplifier is shorter than a length of the first semiconductor optical amplifier.

4. The semiconductor optical phase modulator according to claim 1, wherein the first core layer and the third core layer are formed of a same material and have a same layer structure.

5. The semiconductor optical phase modulator according to claim 1, wherein the first monitoring photodiode includes a first light absorption layer having a fourth multiple quantum well structure, the second monitoring photodiode includes a second light absorption layer having a fifth multiple quantum well structure, and the first core layer, the third core layer, the first light absorption layer, and the second light absorption layer are formed of a same material and have a same layer structure.

6. The semiconductor optical phase modulator according to claim 1, further comprising a third semiconductor optical amplifier, wherein the two child Mach-Zehnder interferometers each include a second 2×2 optical splitter including a third light input port and a fourth light input port, the third light input port is optically coupled to one of the two first arm waveguides of the parent Mach-Zehnder interferometer, and the fourth light input port is optically coupled to the third semiconductor optical amplifier.

7. A method of testing the semiconductor optical phase modulator according to claim 1, the method comprising:

applying a forward bias voltage to one of the first semiconductor optical amplifier and the second semiconductor optical amplifier to emit test light from the one of the first semiconductor optical amplifier and the second semiconductor optical amplifier;

applying a reverse bias voltage to the other of the first semiconductor optical amplifier and the second semiconductor optical amplifier; and comparing an intensity of the test light detected in the other of the first semiconductor optical amplifier and the second semiconductor optical amplifier with a reference light intensity.

8. A method of testing the semiconductor optical phase modulator according to claim 6, the method comprising:

applying a forward bias voltage to the first semiconductor optical amplifier and the third semiconductor optical amplifier to emit first test light from the first semiconductor optical amplifier and emit second test light from the third semiconductor optical amplifier;

applying a reverse bias voltage to the second semiconductor optical amplifier; and comparing an intensity of test light detected in the second semiconductor optical amplifier with a reference light intensity, wherein the intensity of the test light is a sum of a first intensity of the first test light and a second intensity of the second test light.

9. A semiconductor optical phase modulator comprising:

an optical phase modulation element;

a first semiconductor optical amplifier to amplify light input to the optical phase modulation element;

a second semiconductor optical amplifier to amplify modulated signal light output from the optical phase modulation element; and a third semiconductor optical amplifier, wherein the first semiconductor optical amplifier includes a first core layer having a first multiple quantum well structure, the optical phase modulation element includes a second core layer having a second multiple quantum well structure, the second semiconductor optical amplifier includes a third core layer having a third multiple quantum well structure, a first thickness of the first core layer is smaller than a second thickness of the second core layer, a first number of well layers of the first multiple quantum well structure is smaller than a second number of well layers of the second multiple quantum well structure, a third thickness of the third core layer is smaller than the second thickness of the second core layer, a third number of well layers of the third multiple quantum well structure is smaller than the second number of well layers of the second multiple quantum well structure, a light input end of the semiconductor optical phase modulator is a light input end face of the first semiconductor optical amplifier, a light output end of the semiconductor optical phase modulator is a light output end face of the second semiconductor optical amplifier, the optical phase modulation element includes a parent Mach-Zehnder interferometer, two child Mach-Zehnder interferometers, and a phase modulation portion, the parent Mach-Zehnder interferometer includes: two first arm waveguides; and a first 2×2 optical coupler including a first light output port and a second light output port, the two child Mach-Zehnder interferometers are respectively inserted in and connected to the two first arm waveguides, and the two child Mach-Zehnder interferometers each include: two second arm waveguides; and a second 2×2 optical splitter including a third light input port and a fourth light input port, the first semiconductor optical amplifier is connected to the parent Mach-Zehnder interferometer, the phase modulation portion is provided on the two second arm waveguides, the first light output port is optically coupled to the second semiconductor optical amplifier, the two third light input ports are optically connected respectively to the two first arm waveguides of the parent Mach-Zehnder interferometer, and the two fourth light input ports are optically coupled respectively to the third semiconductor light amplifiers that are different from each other.

10. A method of testing a semiconductor optical phase modulator, the semiconductor optical phase modulator comprising:
an optical phase modulation element;
a first semiconductor optical amplifier to amplify light input to the optical phase modulation element; and
a second semiconductor optical amplifier to amplify modulated signal light output from the optical phase modulation element, wherein
the first semiconductor optical amplifier includes a first core layer having a first multiple quantum well structure,
the optical phase modulation element includes a second core layer having a second multiple quantum well structure,
the second semiconductor optical amplifier includes a third core layer having a third multiple quantum well structure,
a first thickness of the first core layer is smaller than a second thickness of the second core layer,
a first number of well layers of the first multiple quantum well structure is smaller than a second number of well layers of the second multiple quantum well structure,
a third thickness of the third core layer is smaller than the second thickness of the second core layer,
a third number of well layers of the third multiple quantum well structure is smaller than the second number of well layers of the second multiple quantum well structure,
a light input end of the semiconductor optical phase modulator is a light input end face of the first semiconductor optical amplifier, and
a light output end of the semiconductor optical phase modulator is a light output end face of the second semiconductor optical amplifier,
the method comprising:
applying a forward bias voltage to one of the first semiconductor optical amplifier and the second semiconductor optical amplifier to emit test light from the one of the first semiconductor optical amplifier and the second semiconductor optical amplifier;
applying a reverse bias voltage to the other of the first semiconductor optical amplifier and the second semiconductor optical amplifier; and
comparing an intensity of the test light detected in the other of the first semiconductor optical amplifier and the second semiconductor optical amplifier with a reference light intensity.

* * * * *